United States Patent [19]
Austin et al.

[11] Patent Number: 6,071,977
[45] Date of Patent: *Jun. 6, 2000

[54] HYDROSILATION IN HIGH BOILING NATURAL VEGETABLE OILS

[75] Inventors: Paul E. Austin, Williamstown; Edmond J. Derderian, Charleston, both of W. Va.; Robert A. Kayser, Washington, Ohio

[73] Assignee: CK Witco Corporation, Greenwich, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/742,192

[22] Filed: Oct. 31, 1996

[51] Int. Cl.$^7$ ........................................................ C08J 9/04
[52] U.S. Cl. .......................... 521/112; 521/131; 521/132; 521/155; 521/170; 521/172; 521/174; 528/48; 528/76; 528/80; 528/85
[58] Field of Search ...................................... 521/112, 131, 521/132, 155, 170, 172, 174; 528/48, 76, 80, 85

[56] References Cited

U.S. PATENT DOCUMENTS

| | | |
|---|---|---|
| 3,280,160 | 10/1966 | Bailey . |
| 3,402,192 | 9/1968 | Haluska . |
| 3,518,288 | 6/1970 | Haluska . |
| 3,980,688 | 9/1976 | Litteral . |
| 4,122,029 | 10/1978 | Gee . |
| 4,222,911 | 9/1980 | Christenson . |
| 4,275,172 | 6/1981 | Barth et al. ............................. 521/112 |
| 4,520,160 | 5/1985 | Brown . |
| 4,810,291 | 3/1989 | Osberghaus et al. ..................... 106/10 |
| 4,857,583 | 8/1989 | Austin . |
| 5,001,248 | 3/1991 | Grabowski ............................. 556/456 |
| 5,153,293 | 10/1992 | Hales . |
| 5,159,096 | 10/1992 | Austin . |
| 5,164,002 | 11/1992 | Ballenger, Jr. et al. ................ 106/267 |
| 5,191,103 | 3/1993 | Mehta . |
| 5,447,963 | 9/1995 | Lichvar . |
| 5,451,615 | 9/1995 | Birch ....................................... 521/130 |
| 5,482,980 | 1/1996 | Pcolinsky ................................ 521/114 |
| 5,510,409 | 4/1996 | Romano .................................. 524/322 |
| 5,575,838 | 11/1996 | Fortune ........................................ 106/9 |
| 5,648,444 | 7/1997 | Austin . |

FOREIGN PATENT DOCUMENTS

| | | |
|---|---|---|
| 2713900 | of 0000 | Germany . |
| 46014070 | of 0000 | Japan . |
| 49032996 | of 0000 | Japan . |
| 54063197 | of 0000 | Japan . |
| 55071777 | of 0000 | Japan . |
| 59226035 | of 0000 | Japan . |
| 81234562 | of 0000 | Poland . |

OTHER PUBLICATIONS

GE Silicone Fluids Viscosity/Molecular Weight Correlation Sheet.

*Primary Examiner*—John M. Cooney, Jr.
*Attorney, Agent, or Firm*—Raymond Thompson

[57] ABSTRACT

An improved process is provided for the preparation of siloxane-oxyalkylene and siloxane-alkyl copolymer compositions via a hydrosilation reaction in the presence of high boiling point natural vegetable oils as the reaction solvent. The reaction solvent need not be removed from the block copolymer product, and indeed is beneficial to remain with the copolymer particularly when the copolymer is used as a surfactant for polyurethane foam formulations. Soybean oil and linseed oil are the preferred high boiling natural oil solvents when the copolymer product is to be used in the preparation of the surfactants for polyurethane foams. High resiliency polyurethane foam prepared with these natural oils present in the surfactant preparation afforded improved compression sets, wet compression sets and humid aged compression sets. Additionally, the use of the surfactants made with natural oils as a reaction solvent or consequently surfactants post diluted with natural oils when employed in the preparation of polyurethane foam afforded foams with greatly reduced amounts of "glass fogging".

21 Claims, No Drawings

HYDROSILATION IN HIGH BOILING NATURAL VEGETABLE OILS

FIELD OF THE INVENTION

This invention relates in general to an improved process for the preparation of organopolysiloxane surfactants. In one aspect, this invention is directed to a process for the preparation of improved siloxane-oxyalkylene copolymer compositions. In a further aspect, the invention is directed to siloxane-oxyalkylene and siloxane-alkyl copolymers and organosiloxanes that are suitable for use as surfactants in, for instance, polyurethane foam, coatings applications, or personal care products.

BACKGROUND OF THE INVENTION

The preparation of siloxane-oxyalkylence or siloxane-alkyl copolymers by the hydrosilation reaction of an organohydrogen siloxane and an unsaturated olefin hydrocarbon or polyoxyalkylene is well known and reported in the literature. The hydrosilation reaction is typically performed in a low molecular weight, highly volatile hydrocarbon solvent such as benzene, toluene or xylene so as to compatibilize the reactants and aid in transfer and filtration of the copolymer products, or to moderate the exothermicity of the hydrosilation.

Less typically, the hydrosilation reaction between the organohydrogenpolysiloxane reactant and the unsaturated polyoxyalkylene or olefin reactant may be conducted without a solvent such as disclosed in U.S. Pat. No. 3,980,688 or conducted in an oxygen containing solvent such as an ether, a polyether, or a lower or higher molecular weight alcohol.

For instance, U.S. Pat. Nos. 3,280,160 and 3,402,192 disclose the preparation of copolymers in n-butyl ether and in a 50/50 mixture of isopropyl alcohol/toluene, respectively. Also in U.S. Pat. No. 4,122,029 the use of isopropyl alcohol is disclosed and U.S. Pat. No. 3,518,288 teaches the use of n-propanol/toluene as a suitable solvent for the preparation of siloxane-oxyalkylene copolymers. U.S. Pat. No. 4,857,583 discloses the use of high boiling point polar polyols as a reaction solvent wherein the solvent is not removed from the final product following the preparation of the siloxane-oxyalkylene copolymers. U.S. Pat. No. 5,153,293 teaches the use of monocarboxylate esters of alkanediols, limited to 2,2,4-trimethyl-1,3 pentanediol monoisobutyrate, as the reaction solvent. While this is a good reaction solvent, it has been found to contribute to glass fogging when utilized in the manufacture of polyurethane foam for automotive interiors. The term "glass fogging" used herein refers to the phenomenon of volatilization of product(s) from e.g. a polyurethane foam when exposed to heat and the redeposition of the volatilized product(s) onto another surface such as the interior of automotive windows.

In the majority of the aforementioned processes, the hydrocarbon solvent is removed after the hydrosilation reaction is completed, since in most cases, the solvent is too flammable, toxic or otherwise detrimental to the final product or further processing steps in which the copolymer is utilized. This is particularly true of volatile aromatic or hydrocarbon solvents if the final product enters into personal care applications where human contact with the final product is expected, or in urethane foam applications where potential "glass fogging" can occur in interior automotive foam applications. Thus, in the processes disclosed in most of the above patents, the solvent was removed from the reaction product after completion of the hydrosilation reaction. Removal of said solvents increases batch cycle times and necessitates disposal of the solvent in an environmentally safe manner such as incineration. Of the above mentioned solvents, isopropyl alcohol (IPA) and toluene are most commonly used. Toluene and IPA are known to compatibilize or improve the miscibility of the siloxane and the unsaturated polyoxyalkylene(s) so that the reaction proceeds more readily. However, disadvantages attend their use. Such disadvantages include: (A) IPA competes with the unsaturated polyether for the silanic sites (SiH) on the siloxane backbone resulting in the formation of the isopropoxysilyl, $(CH_3)_2CHOSi$, functional group which reduces surfactant performance in urethane foam; (B) IPA reacts with isocyanate in polyurethane foam formulations effectively lowering the isocyanate index of the formulation, so that the IPA must be stripped from the product and recovered, a process which is both time consuming and expensive; (C) IPA is miscible with water which is harmful in the manufacture of polyurethane foam surfactants; and (D) toluene and IPA are flammable which creates additional manufacturing problems. In addition, prolonged stripping of surfactants manufactured with toluene or IPA can lead to degradation of surfactant performance.

A few instances have been reported in the literature where for one reason or another it was neither necessary nor desirable to separate the copolymer from the reaction solvent. For example, U.S. Pat. No. 4,520,160 discloses the use of saturated higher alcohols, such as isostearyl alcohol, as a reaction solvent which purposely need not be removed from the resulting copolymer when it is used subsequently in personal care compositions as emulsifiers. U.S. Pat. Nos. 4,857,583 and 5,153,293 also teach that higher boiling point polyols or monocarboxylate esters of an alkanediol, respectively, purposely need not be removed from the resulting copolymer when it is used subsequently in urethane foam formulations. However, as disclosed in these patents, the potential exists for the hydroxy functionality of the solvents to compete with the unsaturated polyoxyalkylene for SiH sites on the siloxane backbone. Additionally, these alcohols contain volatile species which produce "glass fogging" when employed in the manufacture of automobile interior trim foam.

In many instances, however, the solvent does not enter into any further reactions but remains in the final product as is, and hence, there is no need for its removal if it does not adversely affect the production process or the product's intended use in personal care, urethane foam or coatings applications. Thus in some cases, such as personal care products of U.S. Pat. No. 4,520,160, it may even be beneficial to have some of the solvent present in the final product. However, if the copolymer is to undergo further reactions before preparation of the final end-use product is complete, presence of the solvent might adversely affect such reactions and hence its removal after the hydrosilation reaction is desired. For example, if one uses copolymers containing monohydric alcohols in urethane foam applications, these alcohols will enter into the urethane reaction and act as reaction chain terminators in a detrimental fashion because they contain only one hydroxy group. Also as previously indicated, some solvents may be toxic or not suitable for human contact or otherwise undesirable in further processing of the copolymer.

It is therefore an object of the present invention to provide an improved process for the preparation of siloxane-oxyalkylene and siloxane-alkyl copolymers. Another object of the invention is to provide a process for the preparation of lower volatility, clear, homogeneous siloxane-oxyalkylene copolymers or alkyl-siloxanes that are useful and beneficial in the formulation of urethane foam products and wherein it is not necessary to remove the reaction solvent. A further object of the invention is to provide an improved process for the preparation of clear, homogeneous siloxane-oxyalkylene or alkyl-siloxane copolymers which are either prepared in natural vegetable oil or are mixed with natural vegetable oil to arrive at surfactant blends that when utilized in polyurethane foam, cause the foam to have improved compression sets, reduced flammability and reduced fogging tendencies, and other desirable features. These and other objects will readily become apparent to those skilled in the art in the light of the teachings contained herein.

SUMMARY OF THE INVENTION

In its broad aspect, the present invention is directed to an improved process for the preparation of siloxane-oxyalkylene and/or alkyl-siloxane copolymers, their use as surface active agents in the preparation of personal care products, coatings formulations, and polyurethane foam formulations, and the resulting foams obtained therefrom.

In one aspect of the present invention, copolymers are prepared by a hydrosilation reaction between an organohydrogen-polysiloxane and unsaturated polyoxyalkylene or between an organohydrogen-polysiloxane and unsaturated olefin, in the presence of one or more higher boiling point natural vegetable oils, optionally in the presence of specific additives such as are disclosed in U.S. Pat. No. 4,847,398, U.S. Pat. No. 5,191,103 and U.S. Pat. No. 5,159,096. The higher boiling point natural vegetable oil not only aids in the preparation of the copolymer, but if left in the copolymer, also aid in its subsequent handling and serve as a necessary and beneficial component of a composition containing the siloxane-oxyalkylene or the alkyl-siloxane copolymer.

In another aspect of the present invention, copolymers are made by the aforementioned reaction following which higher boiling point natural vegetable oil is added to the reaction product.

Benefits include the reduction in viscosity and pour point for facile transfer of the copolymer product, and improved polyol solubility. When the copolymers which are either made in the natural vegetable oil or are made by any other process and then blended with the natural vegetable oil and then used to make foam, the foam exhibits improved wet and humid aged compression sets, reduces glass fogging characteristics and reduces foam flammability. Semi-drying oils such as soybean, safflower, and dehydrated castor oil as well as drying oils such as linseed or perilla oils are preferred and have the advantages of being non-toxic, non-corrosive and biodegradable. Less preferred are non-drying oils such as cottonseed, coconut or castor oils.

The process of the present invention comprises in one aspect the steps of (A) forming a reaction mixture containing
    (a) an organohydrogensiloxane composed of units having the average formula:

(b) an unsaturated polyoxyalkylene or alkene having the average formula:

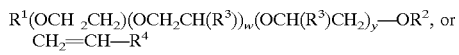

wherein w, z, y, R, $R^1$, $R^2$, $R^3$ and $R^4$ are as hereinafter indicated, (c) a liquid, saturated or internally unsaturated higher boiling point, natural vegetable oil solvent, and
(d) optionally an additive to limit acetal and propanal formation such as sodium propionate, 2,2,6,6-tetramethyl-4-piperidinol or sodium phosphate; and (B) reacting said components (a) and (b) to form the copolymer, for instance by
    (i) maintaining the mixture in an inert atmosphere to a temperature which does not exceed the temperature at which the organohydrogensiloxane reacts with the solvent,
    (ii) adding to said heated mixture, a catalytic amount of a noble metal hydrosilation catalyst, and
    (iii) maintaining the temperature of said mixture below about 125° C., whereby said copolymer is formed, and (C) processing to recover said copolymer in admixture with residual high boiling point natural oil solvent.

In another aspect of the present invention, the reaction of components (a) and (b) is carried out in the presence of any solvent effective for the desired reaction, and the aforementioned component (c) is thereafter added to the mixture formed by the reaction.

Another aspect of the present invention is directed to making foams with improved physical properties. The foams are preferably made with copolymer mixtures containing the higher boiling natural oil component. The foams can also be made with a mixture of (a) organosiloxane composed of units of the formula $R_a SiO_{(4-a)/2}$ wherein each R group is a substituted or unsubstituted monovalent hydrocarbon radical containing 1 to 12 carbon atoms and each a is 1 to 3, and (b) a higher boiling natural oil component as described herein.

Foams produced via any of the aspects of the present invention exhibit a number of favorable attributes. For example, good set properties are an important requirement of HR molded foam. Compression set (CS), and humid aged compression set (HACS) are traditional measures of foam set properties. Wet set (WS), which refers to a 50% compression set conducted at 50° C. and 95% relative humidity, is a more recent performance criterion for molded foam.

Meeting wet set performance requirements for HR molded foam at reduced densities while preserving other physical properties is a challenge. In general, as densities are reduced, wet sets deteriorate along with most other physical properties. Therefore an improvement (reduction) in wet set values, and in general all set values, while preserving other physical properties is an important benefit.

Yet another aspect of the present invention is directed to making foams with improved combustion properties. It is well known that combustion properties deteriorate with decreasing foam density. Therefore an improvement in combustion properties at lower densities without adversely affecting other physical properties is an important benefit.

DETAILED DESCRIPTION OF THE INVENTION

As indicated above, the present invention provides an improved process and composition of matter for the preparation of organosiloxane copolymer surfactants. The process involves the hydrosilation reaction of an organohydrogen-polysiloxane and an unsaturated polyoxyalkylene or olefin in the presence of a high boiling point natural vegetable oil such as linseed, safflower, soybean or corn oil, and optionally in the presence of an additive to control acetal and propanal formation. The high boiling point natural vegetable oils not only aid in the preparation of the siloxane-oxyalkylene or siloxane-alkyl copolymers, but when left in the copolymer, also aid in its subsequent handling and serve as a necessary and beneficial component of compositions containing the siloxane-oxyalkylene or siloxane-alkyl copolymer, particularly when such copolymers arc used as surfactants in agricultural adjuvants, personal care and coatings products, or in the preparation of polyurethane foam.

The organosiloxane copolymers made by this process are believed to produce superior surfactant blends (for instance in their properties and in the properties obtained on subsequent use) to organosiloxane copolymers made by other processes not involving the presence of the natural vegetable oils during the copolymerization reaction. Additionally, copolymers made by other processes to which such oils arc added after the copolymerization and recovery of the copolymer are believed to produce surfactant blends which are superior (for instance in properties obtained on subsequent use) to organosiloxane or silicone-alkyl copolymers used to make foams without the benefit of natural vegetable oils present. It is an important teaching of this invention that natural oils beneficiate the performance of the foams both when used in the manufacture of the siloxane copolymer and when used as an additive to a copolymer made by any other process.

ORGANOHYDROSILOXANES

The organohydrogensiloxane compounds employed in the present invention for the preparation of the surfactants are those composed of multiple siloxane units each represented by the formula:

$$R_aH_bSiO_{(4-a-b)/2}$$

The R groups represent substituted or unsubstituted monovalent hydrocarbon radicals of from 1 to 12 carbon atoms, a and b are integers, and a has a value of from 0 to 3, b has a value of from 0 to 1, and the sum of (a+b) has a value of from 0 to 3. The organohydrogen-polysiloxane can contain any combination of siloxane units selected from the group consisting of $R_3SiO_{1/2}$, $R_2HSiO_{1/2}$, $R_2SiO_{2/2}$, $RH_2SiO_{2/2}$, $RH_2SiO_{1/2}$, $RSiO_{3/2}$, $HSiO_{3/2}$ and $SiO_{4/2}$ provided, of course, that the organohydrogen-polysiloxane contains sufficient R-containing siloxane units to provide from about 1 to about 3 R radicals per silicon atom and at least one of the siloxane units contains at least one hydrogen bonded to silicon. As is well known, non-cyclic siloxanes are end-capped with $R_aH_bSiO_{1/2}$— wherein (a+b) is 3.

Such silanic fluids typically are prepared by the acid equilibration of a mixture which may contain cyclic diorganosiloxanes, typically octamethyltetrasiloxane, hexamethyldisiloxane or tetrainethyidisiloxane and/or another source of organohydrogensiloxane. Usually, the acid equilibration catalyst is concentrated triflic acid or sulfuric acid or a supported resin containing sulfuric acid functionality. Following equilibration, the resulting silanic fluid may be rendered neutral through the use of mild bases which are typically sodium bicarbonate or sodium carbonate. Illustrative of suitable R radicals are alkyl radicals such as methyl, ethyl, propyl, butyl, decyl, cycloaliphatic radicals such as cyclohexyl and cyclooctyl; aryl radicals such as phenyl, tolyl, and xylyl, and substituted hydrocarbon groups such as heptafluoropropyl. R is preferably methyl.

POLYETHERS or OLEFINS

The unsaturated polyoxyalkylene or olefin reactant which can be employed in the process of this invention has the average formula:

$$R^1(OCH_2CH_2)_z(OCH_2CH(R^3))_w(OCH(R^3)CH_2)_yOR^2,$$

or $$CH_2=CH-R^4$$

wherein $R^1$ denotes a monovalent unsaturated hydrocarbon group containing from 3 to 10 carbon atoms such as allyl, methallyl, propargyl or 3-pentynyl. When the unsaturation is olefinic, it is desirably terminal to facilitate complete hydrosilation. $R^2$ is selected from the group consisting of hydrogen, alkyl groups containing one to eight carbon atoms, acyl groups containing 2 to 8 carbon atoms, tri-($C_1$–$C_8$-alkyl)silyl groups, or cycloaliphatic ether groups of from 4 to 6 carbon atoms. Preferably $R^2$ is hydrogen, methyl, n-butyl, t-butyl, or acetyl. $R^3$ and $R^4$ are independently of each other monovalent hydrocarbon groups such as the $C_1$–$C_{20}$ alkyl or branched alkyl groups (for example, methyl, ethyl, isopropyl, 2-ethyihexyl and stearyl), or aryl groups (for example, phenyl and naphthyl), or alkaryl groups (for example, benzyl, phenethyl and nonylphenyl), or cycloalkyl groups (for example, cyclohexyl and cyclooctyl). Methyl is the most preferred $R^3$. Isobutyl is the most preferred $R^4$ group. The subscript z has a value of 0 to 100. The subscripts w and y each are 0 to 120 and (w+y) has a value of 0 to 120. Preferred values of z and (w+y) are 1 to 50 inclusive. The unsaturated polyether, whether comprising an alkyne group or olefinic group, may be a block or randomly distributed copolymer of oxyalkylenes.

HIGH BOILING NATURAL VEGETABLE OIL SOLVENTS

In contrast to the prior art processes, the present invention utilizes liquid, high boiling point natural vegetable oils as the hydrosilation reaction solvents, which need not be removed from the reaction mixture. It is indeed beneficial to allow the oil or oils to remain as a part of the reaction mixture, particularly when the copolymer reaction product is subsequently used in the preparation of personal care and coatings products, or in the preparation of polyurethane foam.

Suitable high boiling natural vegetable oils useful in this invention include but are not limited to the natural vegetable oils such as soybean oil, Lincoln bean oil, Manchurian bean oil, corn oil, safflower oil, palm oil, linseed oil, sesame oil, perilla oil, cottonseed, coconut, dehydrated castor oil and olive oil.

The particular solvents which are employed in the present invention are natural vegetable oil solvents, derived from natural sources, which have boiling points of greater than 200° C. at atmospheric pressure. In contrast to the prior art processes, the hydrosilation solvent of the present invention is a high boiling natural vegetable oil or mixture thereof which typically does not interfere with the hydrosilation reaction. This solvent need not be removed from the copolymer product prior to its use. The natural oil solvents have been found to be inert under the hydrosilation reaction conditions and are essentially non-toxic and non-hazardous and biodegradable and impart improved polyurethane foam characteristics. Many of them are well known commercial products typically used as cmollients, emulsifiers and plasticizers and as cooking oils. The natural vegetable oils can be hydrogenated or methylated derivatives of naturally occurring vegetable oils and are preferably liquid. A list of suitable natural oils are reviewed in the *Encyclopedia of Chemical Technology*, edited by Kirk-Othmer third edition Vol. 9, and published by John Wiley & Sons. Examples of preferred solvents are soybean oil, linseed oil, and safflower oil.

As indicated above, it is important that the natural vegetable oil solvent have a normal boiling point greater that about 170° C., and preferably greater than 200° C., especially when the copolymer product is to be used in making interior automotive foam. The high boiling natural oil solvent must also be free of impurities which can poison the hydrosilation catalyst, or impair the performance of the copolymer product in its applications.

HYDROSILATION

As previously indicated, the hydrosilation reaction is conducted in the presence of a noble metal hydrosilation catalyst. Thus, the hydrosilation reaction between the organohydrogenpolysiloxane and an unsaturated polyoxyalkylene or unsaturated olefin reactant is facilitated by using catalytic amounts of a noble metal-containing catalyst. Such catalysts are well known and include platinum, palladium and rhodium-containing catalysts. They are reviewed in the compendium, *Comprehensive Handbook on Hydrosilylation*, edited by B. Marciniec and published by Pergamon Press, NY 1992. Clloroplatinic acid and the platinum complexes of 1,3-divinyltetramethyidisiloxane are particularly preferred.

The catalyst is employed in an effective amount sufficient to initiate, sustain and complete the hydrosilation reaction. The amount of catalyst used is usually within the range of from about 1 to about 100 parts per million (ppm) of noble metal, based on the total parts of the mixture of reactants and solvent. Catalyst concentrations of 5–50 ppm are preferred.

The hydrosilation reaction, as previously noted, can be optionally conducted in the presence of additives such as the carboxylic acid salts disclosed in U.S. Pat. No. 4,847,398, or the sterically hindered nitrogen compounds of U.S. Pat. No. 5,191,103 or the phosphate salts of U.S. Pat. No. 5,159,096. Depending on the method of manufacture of the reactants and solvents, one or more of these additives may be present during the hydrosilation of unsaturated polyethers or olefins with organohydrogen-polysiloxanes. For example, a low, but sometimes adequate level of carboxylic acid salts or phosphate salts may already be present in olefinically substituted polyoxyalkylenes due to inadvertent exposure to traces of oxygen during subsequent capping of hydroxyl groups with allylic, methallylic, methyl or acyl groups. In such instances, the intentional use of the salt or other additive may not be necessary.

ORGANOSILOXANE-OIL MIXTURES

With respect to the mixtures referred to hereinabove of (a) one or more organosiloxanes composed of units of the formula $R_aSIO_{(4-a)/2}$ and (b) a higher boiling natural oil component as described herein, the value of a is 1 to 3 and each R is a monovalent hydrocarbon radical containing 1 to 12 carbon atoms.

Each R is preferably methyl. In these mixtures, the average molecular weight of the one or more organosiloxanes is up to 16,000 daltons. The oil component, which is selected from the group consisting of naturally occurring vegetable oils, hydrogenated derivatives thereof, methylated derivatives thereof, and mixtures of any of the foregoing, is preferably selected from the group consisting of soybean oil, safflower oil, linseed oil, corn oil, palm oil, sesame oil, castor oil, coconut oil, olive oil, babassu oil, cottonseed oil, oiticica oil, palm kernel oil, sunflower oil, tung oil, rapeseed oil, perilla oil, hydrogenated and methylated derivatives thereof, and mixtures of any of the foregoing. More preferably, the oil component is selected from the group consisting of soybean oil, safflower oil, linseed oil, and mixtures thereof. The oil component should comprises 5 to 95% of the mixture formed with the one or more organosiloxanes.

BENEFITS OF THE INVENTION

By conducting the hydrosilation reaction in the manner indicated above, and employing the high boiling point natural vegetable oils, improvements arc obtained in aspects of the reaction, such as reaction rate, reaction yield, reaction selectivity, reaction processing during manufacture or reaction product processing in polyurethane foam, personal care and coatings applications. For example, when at least 20 weight percent (based on the total weight of reactants) soybean oil is used, it aids in the handling of the reactants and it moderates the reaction exotherm. Of course, amounts of higher boiling point natural vegetable oils larger than 20 percent can be used, if desired. In general, from 5 to about 80 weight percent, and more preferably from about 20 to 75 weight percent, of the natural vegetable oil or oils has been found to give good results during the hydrosilation reaction, and, when the product surfactail is employed as a polyurethane surfactant, improved compression sets are observed with increasing amounts of natural vegetable oils.

The organopolysiloxane surfactants prepared by the process of the present invention are particularly useful as, and have been found to be excellent and efficient, surfactants for the preparation of closed celled rigid foams, automotive interior foam, and flexible polyether polyurethane foams. It has been found that the surfactants of this invention provide improved performance to polyurethane foams and avoid the necessity of solvent removal from the reaction mixture in which the organopolysiloxane was prepared. For example, surfactants prepared in soybean oil or linseed oil show increased solubility in some polyols and surprisingly impart improved wet and humid aged compression sets in high resiliency polyurethane foams typically used in automotive seating. Additionally, these same polyurethane foam parts afforded greatly reduced volatility characteristics when compared to foams prepared with surfactants currently commercially available. Moreover, these surfactants do not contribute to glass fogging, as measured by SAE J-1756, when the foams are used in interior automotive trim. Further, these surfactants improve the flammability characteristics (as measured by DOT MVSS No. 302) of the foams resulting from their use.

FOAMS

In producing polyurethane and polyisocyanurate foams using the copolymer surfactant compositions of this invention, one or more polyether and/or polyester polyols is reacted with a polyisocyanate reactant to provide the urethane linkage. Useful polyols have an average of at least two, and typically 2.0 to 6.0 hydroxyl (OH) groups per molecule and include compounds which consist of carbon, hydrogen and oxygen and compounds which may also contain phosphorus, halogen, and or nitrogen. Such polyether polyols are well known in the art and are commercially available.

Likewise, the organic polyisocyanates (as used herein, the term "polyisocyanate" includes diisocyanates) that are useful in producing rigid polyurethane and polyisocyanurate and flexible polyurethane foams in accordance with the process of this invention are also well known in the art and are organic compounds that contain at least two isocyanate (NCO) groups, and preferably 2.1–3.5 NCO functionalities per molecule. Any such compounds or mixtures thereof can be employed. Toluene diisocyanates (TDI), methylene diphcnylisocyanate (MDI) and polymeric isocyanates are among many suitable isocyanates which are commercially used in the preparation of foams.

The urethane-foaming reaction is usually effected in the presence of a minor amount of a catalyst, preferably an amine catalyst and usually a tertiary amine. It is also preferred to include a minor amount of certain metal catalysts in addition to the amine catalyst as a component to the reaction mixture. Such supplementary catalysts are well known to the art of flexible, froth, rigid or high resiliency polyurethane foam manufacture. For example, useful metal catalysts include organic derivatives of potassium and tin, particularly potassium acetate and potassium octoate and tin compounds of carboxylic acids such as stannous octoate, stannous oleate and the like.

Foaming is accomplished by employing a small amount of a polyurethane blowing agent such as water in the reaction mixture, which upon reaction with isocyanate generates carbon dioxide in situ, or through the use of auxiliary blowing agents which are gaseous (such as carbon dioxide or nitrogen) or are vaporized by the exotherm of the reaction or by a combination of these two methods. These methods are well known in the art.

The polyurethane and polyisocyanurate foams of this invention may be formed in accordance with any of the processing techniques known to the art such as in particular, the "one shot" technique. In accordance with this method, foamed products are produced by carrying out the reaction of the polyisocyanate and polyether or polyester polyol simultaneously with the foaming operation. It is sometimes convenient to add the surfactant to the reaction mixture as a pre-mixture with one or more of the blowing agents, polyether, polyol and catalyst components.

It is understood that the relative amounts of the various components of the foam formulation are not narrowly critical. The polyether or polyester polyol and polyisocyanate are present in the foam-producing formulation in a major amount. The relative amounts of these two components in the amount required to produce the desired polyurethane or polyisocyanurate structure of the foam and such relative amounts are well known in the art. The blowing agent, catalyst and surfactant are each present in effective additive amounts necessary to achieve the function of the component. Thus, the blowing agent is present in an amount sufficient to foam the reaction mixture, typically one to five pphp, the catalyst is present in a catalytic amount which is that amount necessary to catalyze the reaction to produce the urethane at a reasonable rate, typically 0.2 to 1.0 pphp; and the surfactant is an amount sufficient to impart the desired properties as indicated below, typically 0.5 to 2.0 pphp.

The polyurethanes produced in accordance with the present invention can be used in the same areas as conventional flexible, rigid, froth and automotive interior polyurethanes foams. For example, the foams of the present invention can be used with advantage in the manufacture of cushions, mattresses, padding, carpet underlay, packaging, thermal insulators, automotive interior foam and the like.

HYDROSILATION PROCEDURE

Each hydrosilation reaction was performed in a 4-necked round bottom flask of volume appropriate for the total quantity of reagents and solvent to be used. The flask was fitted with a mechanical stirrer, Friedrich condenser, temperature-controlled heating mantle, thermometer and a sparge tube connected to a nitrogen source. Typically, weighed quantities of an SiH fluid, polyether or olefin, high boiling natural vegetable oil solvent and optionally, additives to control propanal and acetal formation, were added to the flask and the mixture was stirred and sparged while being heated to the catalyzation temperature (typically 45–85° C.). The reaction was catalyzed with the appropriate Platinum catalyst concentration by the addition of a 3.3% solution of hexachloroplatinic acid (CPA) in ethanol. A temperature increase indicative of the exothermicity of hydrosilations was observed after some minutes and the reaction mixture cleared. Completeness of the hydrosilation was determined by the test for SiH functional groups, i.e., the volume of $H_2$ produced when a known weight of the reaction mixture was treated with alcoholic KOH was measured as described in A. L. Smith (Editor), *Analysis of Silicones*, John Wiley and Sons, NY 1974, pp 145–149. If necessary, the copolymer product was filtered prior to its characterization and testing.

| LIST OF MATERIALS AND DEFINITIONS OF ABBREVIATIONS | |
|---|---|
| M = | $(CH_3)_3SiO_{1/2}$, D = $(CH_3)_2SIO_{2/2}$, D' = $CH_3SiHO_{2/2}$, M' = $(CH_3)_2SiHO$ |
| CPA = | hexachloroplatinic acid catalyst solution in ethanol |
| 1-octene = | $CH_2$=$CH(CH_2)_5CH_3$ |
| Polyether A = | A polyether composed of 100 wt % ethylene oxide and 350 daltons average molecular weight terminated at one end by a methyl group and the other end by an allyl group. |
| Polyether B = | A polyether composed of 100 wt % propylene oxide and 800 daltons average molecular weight terminated at one end by a hydroxyl group and the other end by an allyl group. |
| Polyether C = | A polyether composed of 100 wt % propylene oxide and 200 daltons average molecular weight terminated at one end by a hydroxyl group and the other end by an allyl group. |
| Polyether D = | A polyether composed of 100 wt % propylene oxide and 750 daltons average molecular weight terminated at one end by a hydroxyl group and the other end by a butyl group. |
| Polyether E = | A polyether composed of 20 wt % ethylene oxide/ 80 wt % propylene oxide and 2000 daltons average molecular weight terminated at one end by a hydroxyl group and the other end by an allyl group. |
| Polyether F = | A polyether composed of 100 wt % ethylene oxide and 204 daltons molecular weight terminated at one end by a methyl group and the other end by an allyl group. |
| gr = | gram |
| wt % = | weight percent |
| cSt = | centistokes |
| ppm = | parts per million |

EXAMPLES

Examples 1–6 are comparative examples in which known hydrosilation reaction solvents currently used in the preparation of siloxane-oxyalkylene or siloxane-alkyl copolymers were employed. The illustrated aromatic solvents include toluene and Ucane Alkylate-11™ (available from Union Carbide Corp.), which are known to those skilled in the art of hydrosilation chemistry. These examples demonstrate the less than desired hydrosilation reaction compatibility characteristics of the solvent and/or the highly volatile nature of the resulting product. Examples 7–21 below demonstrate the production of copolymers in higher boiling point natural vegetable oil solvents including soybean oil (Examples 7–16), linseed oil (Examples 17–20) and safflower oil (Example 21) as examples of the present invention with improved hydrosilation reaction characteristics and reduced product volatility without removal of the reaction solvent from the resulting surfactant product.

In addition to the SiH test for reaction completeness, the copolymer products of Examples 1–21 were evaluated for product clarity, viscosity at 25° C., and volatility, and in certain instances their performance as surfactants in polyurethane foam formulations was evaluated.

Example 1 (Comparative Example)

A well stirred mixture of 184.2 grams of Polyether E and 15.8 grams of an organohydrogen-polysiloxane of average formula $MD_{15}D'_5M$ and 60 grams (23 wt %) of toluene was deaerated by nitrogen sparge and heated to 80° C. A solution of $H_2PtCl_6.6H_2O$ in ethanol was added to the mixture in sufficient amount to provide 20 ppm Pt. The heat source was removed and the exothermic hydrosilation reaction was allowed to proceed until no further temperature increase was noted. Heat was then added to the mixture as needed to keep its temperature at 80° C. for 2 hours. Care was taken never to allow the reaction pot to exceed 100° C. A clear solution of a siloxane-oxyalkylene copolymer containing no gel particles and only trace levels of residual silanic hydrogen was obtained. Its viscosity at 25° C. was 215 cSt.

Example 2 (Comparative Example)

A well stirred mixture of 37.1 grams of Polyether F, 6.0 grams of Polyether C, and 53.4 grams of an organohydrogeno-polysiloxane having the average formula $MD_2D'_{1.5}M$ and 27.2 grams (22 wt %) of toluene was deacrated by nitrogen sparge and heated to 80° C. A solution of $H_2PtCl_6.6H_2O$ in ethanol was added to the mixture in sufficient amount to provide 20 ppm Pt. The heat source was removed and the exothennic hydrosilation reaction was allowed to proceed until no further temperature increase was noted. Heat was then added to the mixture as needed to keep its temperature at 80° C. for 2 hours. Care was taken never to allow the reaction pot to exceed 100° C. A clear solution of a siloxane-oxyalkylene copolymer containing no gel particles and no detectable levels of residual silanic hydrogen was obtained. Its viscosity at 25° C. was 5 cSt.

Example 3 (Comparative Example)

A well stirred mixture of 41.14 grams of Polyether F, 58.9 grams of an organohydrogen-polysiloxane having the average formula $MD_2D'_1M$ and 29.88 grams (23 wt %) of toluene was deacrated by nitrogen sparge and heated to 80° C. A solution of $H_2PtCl_6.6H_2O$ in ethanol was added to the mixture in sufficient amount to provide 20 ppm Pt. The heat source was removed and the exothermic hydrosilation reaction was allowed to proceed until no further temperature increase was noted. Heat was then added to the mixture as needed to keep its temperature at 80° C. for 2 hours. Care was taken never to allow the reaction pot to exceed 100° C. A clear solution of a siloxane-oxyalkylene copolymer containing no gel particles and no detectable levels of residual silanic hydrogen was obtained. Its viscosity at 25° C. was 4 cSt.

Example 4 (Comparative Example)

A well stirred mixture of 41.2 grams of Polyether F, 48.75 gm of organohydrogen-polysiloxane of average formula, $MD_2D'_{0.9}M$, and 26.9 grams (23 wt %) of toluene was deaerated by nitrogen sparge and heated to 80° C. A solution of H $PtCl_6.6H_2O$ in ethanol was added to the mixture in sufficient amount to provide 20 ppm Pt. The heat source was removed and the exothermic hydrosilation reaction was allowed to proceed until no further temperature increase was noted. Heat was then added to the mixture as needed to keep its temperature at 80° C. for 6 hours. The silanic hydrogen content was analyzed to be 0.5 cc $H_2$/gram. The reaction mixture was allowed to react another 3 hours at 80° C. Care was taken never to allow the reaction pot to exceed 100° C. A clear solution of a siloxane-oxyalkylene copolymer containing no gel particles and with a 0.5 $ccH_2$/gm residual silanic hydrogen content was obtained. Its viscosity at 25° C. was 12 cSt.

Example 5 (Comparative Example)

A well stirred mixture of approximately 41.5 grams of 4-methyl-1-pentene, 58.5 grams of an organohydrogen-polysiloxane of average formula, $MD'_2M$, and 31 grams (23 wt %) of toluene was deacrated by nitrogen sparge and heated to 50° C. A solution of $H_2PtCl_6.6H_2O$ in ethanol was added to the mixture in sufficient amount to provide 20 ppm Pt. The heat source was removed and the exothermic hydrosilation reaction was allowed to proceed until no further temperature increase was noted. Heat was then added to the mixture as needed to keep its temperature at 80° C. for 4 hours. Care was taken never to allow the reaction pot to exceed 100° C. A clear solution of a siloxane-alkyl copolymer containing no gel particles and with a 0.15 $ccH_2$/gm residual silanic hydrogen content was obtained. Its viscosity at 25° C. was 4 cSt.

Example 6 (Comparative Example)

A well stirred mixture of 41.1 grams of Polyether F, 58.9 grams of an organohydrogen-polysiloxane of average formula $MD_2D'_1M$, and 100 grams (50 wt %) of Ucane Alkylate-11™ was deaerated by nitrogen sparge and heated to 80° C. A solution of $H_2PtCl_6.6H_2O$ in ethanol was added to the mixture in sufficient amount to provide 20 ppm Pt. The heat source was removed and the exothermic hydrosilation reaction was allowed to proceed until no further temperature increase was noted. Heat was then added to the mixture as needed to keep its temperature at 80° C. for 2 hours. Care was taken never to allow the reaction pot to exceed 100° C. A clear solution of a siloxane-oxyalkylene copolymer with no residual silanic hydrogen and a 25° C. viscosity of 6 cSt was obtained.

Example 7

A well stirred mixture of 23.72 grams of 1-octene, 36.28 grams of an organohydrogen-polysiloxane of formula, MD'M, and 240 grams (80 wt %) of soybean oil was dcaerated by nitrogen sparge and heated to 75° C. A solution of $H_2PtCl_6.6H_2O$ in ethanol was added to the mixture in sufficient amount to provide 20 ppm Pt. The heat source was removed and the exothermic hydrosilation reaction was allowed to proceed until no further temperature increase was noted. Heat was then added to the mixture as needed to keep its temperature at 75° C. for 2 hours. Care was taken never to allow the reaction pot to exceed 100° C. A clear solution of a siloxane-alkyl copolymer with no residual silanic hydrogen content and a 25° C. viscosity of 29 cSt was obtained.

Example 8

A well stirred mixture of 166.4 grams of Polyether B, 33.8 grams of an organohydrogen polysiloxane of average formula MD'M and 200 grams (50 wt %) of soybean oil was deacrated by nitrogen sparge and heated to 75° C. A solution of $H_2PtCl_6.6H_2O$ in ethanol was added to the mixture in sufficient amount to provide 20 ppm Pt. The heat source was removed and the exothermic hydrosilation reaction was allowed to proceed until no further temperature increase was noted. Heat was then added to the mixture as needed to keep its temperature at 75° C. for 2 hours. Care was taken never to allow the reaction pot to exceed 100° C. A clear solution of a siloxane-oxyalkylene copolymer containing no detectable levels of residual silanic hydrogen and showing a 25° C. viscosity of 64 cSt was obtained.

Example 9

A well stirred mixture of 106.6 grams of Polyether C, 93.5 grams of an organohydrogen-polysiloxane of formula MD'$_1$M, and 200 grams (50 wt %) of soybean oil was deaerated by nitrogen sparge and heated to 72° C. A solution of H$_2$PtCl$_6$.6H$_2$O in ethanol was added to the mixture in sufficient amount to provide 20 ppm Pt. The heat source was removed and the exothermic hydrosilation reaction was allowed to proceed until no further temperature increase was noted. Heat was then added to the mixture as needed to keep its temperature at 75° C. for 2 hours. Care was taken never to allow the reaction pot to exceed 100° C. A clear solution of a siloxane-oxyalkylene copolymer containing no detectable levels of residual silanic hydrogen and showing a 25° C. viscosity of 24 cSt was obtained.

Example 10

A well stirred mixture of 184.2 grams of Polyether E, 15.8 grams of an organohydrogen-polysiloxane of average formula, MD$_{15}$D'$_5$M, and 200 grams (50 wt %) of soybean oil was deaerated by nitrogen sparge and heated to 85° C. A solution of H$_2$PtCl$_6$.6H$_2$O in ethanol was added to the mixture in sufficient amount to provide 20 ppm Pt. The heat source was removed and the exothermic hydrosilation reaction was allowed to proceed until no further temperature increase was noted. Heat was then added to the mixture as needed to keep its temperature at 85° C. for 3 hours. Care was taken never to allow the reaction pot to exceed 100° C. A clear, viscous solution of a siloxane-oxyalkylene copolymer containing no detectable levels of residual silanic hydrogen and possessing a viscosity of 275 cSt at 25° C. was obtained.

Example 11

A well stirred mixture of 140.5 grams of Polyether A, 59.61 grams of an organohydrogen-polysiloxane of formula, MD'$_1$M, and 200 grams (50 wt %) of soybean oil was deaerated by nitrogen sparge and heated to 83° C. A solution of H$_2$PtCl$_6$.6H$_2$O in ethanol was added to the mixture in sufficient amount to provide 20 ppm Pt. The heat source was removed and the exothermic hydrosilation reaction was allowed to proceed until no further temperature increase was noted. Heat was then added to the mixture as needed to keep its temperature at 85° C. for 3 hours. Care was taken never to allow the reaction pot to exceed 100° C. A clear solution of a siloxane-oxyalkylene copolymer containing no detectable levels of residual silanic hydrogen and possessing a viscosity of 31 cSt at 25° C. was obtained.

Example 12

A well stirred mixture of 41.14 grams of Polyether F, 58.9 grams of an organohydrogen-polysiloxane having the average formula MD$_2$D'$_1$M and 300 grams (75 wt %) of soybean oil was deaerated by nitrogen sparge and heated to 81° C. A solution of H$_2$PtCl$_6$.6H$_2$O in ethanol was added to the mixture in sufficient amount to provide 5 ppm Pt. The heat source was removed and the exothermic hydrosilation reaction was allowed to proceed until no further temperature increase was noted. Heat was then added to the mixture as needed to keep its temperature at 80° C. for 2 hours. Care was taken never to allow the reaction pot to exceed 100° C. A clear solution of a siloxane-oxyalkylene copolymer containing no gel particles and no detectable levels of residual silanic hydrogen was obtained. Its viscosity at 25° C. was 33 cSt.

Example 13

A well stirred mixture of 41.2 grams of Polyether F, 48.75 grams of an organohydrogen-polysiloxane having the average formula MD$_2$D'$_{1.5}$M and 302 grams (77 wt %) of soybean oil was deaerated by nitrogen sparge and heated to 80° C. A solution of H$_2$PtCl$_6$.6H$_2$O in ethanol was added to the mixture in sufficient amount to provide 10 ppm Pt. The heat source was removed and the exothermic hydrosilation reaction was allowed to proceed until no further temperature increase was noted. Heat was then added to the mixture as needed to keep its temperature at 80° C. for 2 hours. Care was taken never to allow the reaction pot to exceed 100° C. A clear solution of a siloxane-oxyalkylene copolymer containing no gel particles and no detectable levels of residual silanic hydrogen was obtained. Its viscosity at 25° C. was 36 cSt.

Example 14

A well stirred mixture of 129.4 grams of Polyether B, 70.6 grams of an organohydrogen-polysiloxane of average formula M'D$_{15}$M' and 200 grams (50 wt %) of soybean oil was deaerated by nitrogen sparge and heated to 80° C. A solution of H$_2$PtCl$_6$.6H$_2$O in ethanol was added to the mixture in sufficient amount to provide 10 ppm Pt. The heat source was removed and the exothermic hydrosilation reaction was allowed to proceed until no further temperature increase was noted. Heat was then added to the mixture as needed to keep its temperature at 80° C. for 2 hours. Care was taken never to allow the reaction pot to exceed 100° C. A clear solution of a siloxane-oxyalkylene copolymer containing no detectable levels of residual silanic hydrogen and showing a 25° C. viscosity of 83 cSt was obtained.

Example 15

A well stirred mixture of 43.2 grams of Polyether F, 7.0 grams of Polyether C, 53.4 grams of an organohydrogen-polysiloxane of average formula MD$_2$D'$_1$M and 300 grams (75 wt %) of soybean oil was deaerated by nitrogen sparge and heated to 80° C. A solution of H$_2$PtCl$_6$.6H$_2$O in ethanol was added to the mixture in sufficient amount to provide 10 ppm Pt. The heat source was removed and the exothermie hydrosilation reaction was allowed to proceed until no further temperature increase was noted. Heat was then added to the mixture as needed to keep its temperature at 80° C. for 2 hours. Care was taken never to allow the reaction pot to exceed 100° C. A clear solution of a siloxane-oxyalkylene copolymer containing no detectable levels of residual silanic hydrogen and showing a 25° C. viscosity of 32 cSt was obtained.

Example 16

A well stirred mixture of 41.6 grams of 4-methyl-1-pentene, 58.4 grams of an organohydrogen-polysiloxane of average formula, MD'$_2$M, and 300 grams (75 wt %) of soybean oil was deaerated by nitrogen sparge and heated to 45° C. A solution of H$_2$PtCl$_6$.6H$_2$O in ethanol was added to the mixture in sufficient amount to provide 20 ppm Pt. The heat source was removed and the exothermic hydrosilation reaction was allowed to proceed until no further temperature increase was noted. Heat was then added to the mixture as needed to keep its temperature at 75° C. for 4 hours. Care was taken never to allow the reaction pot to exceed 100° C. A clear solution of a siloxane-alkyl copolymer with <0.1 ccH$_2$/gm of residual silanic hydrogen content and a 25° C. viscosity of 36 cSt was obtained.

Example 17

A well stirred mixture of 28.7 grams of 1-octene, 36.28 grams of an organohydrogen-polysiloxane of formula, MD'$_1$M, and 240 grams (78 wt %) of linseed oil was deaerated by nitrogen sparge and heated to 80° C. A solution of H$_2$PtCl$_6$.6H$_2$O in ethanol was added to tile mixture in sufficient amount to provide 20 ppm Pt. The heat source was removed and the exothermic hydrosilation reaction was allowed to proceed until no further temperature increase was noted. Heat was then added to the mixture as needed to keep its temperature at 80° C. for 2 hours. Care was taken never to allow the reaction pot to exceed 100° C. A clear solution of a siloxane-alkyl copolymer with no residual silanic hydrogen content and a 25° C. viscosity of 28 cSt was obtained.

Example 18

A well stirred mixture of 140.5 grams of Polyether A, 59.61 grams of an organo-hydrogen-polysiloxane of formula, MD'$_1$M, and 200 grams (50 wt %) of linseed oil was deacrated by nitrogen sparge and heated to 80° C. A solution of H$_2$PtCl$_6$.6H$_2$O in ethanol was added to the mixture in sufficient amount to provide 20 ppm Pt. The heat source was removed and the exothermic hydrosilation reaction was allowed to proceed until no further temperature increase was noted. Heat was then added to the mixture as needed to keep its temperature at 80° C. for 3 hours. Care was taken never to allow the reaction pot to exceed 100° C. A clear solution of a siloxane-oxyalkylene copolymer containing <0.1 ccH$_2$/gm of residual silanic hydrogen and possessing a viscosity of 29 cSt at 25° C. was obtained.

Example 19

A well stirred mixture of 41.59 grams of 4-methyl-1-pentene, 58.41 grams of an organohydrogen-polysiloxane of average formula, MD'$_2$M, and 300 grams (75 wt %) of linseed oil was deacrated by nitrogen sparge and heated to 75° C. A solution of H$_2$PtCl$_6$.6H$_2$O in ethanol was added to the mixture in sufficient amount to provide 20 ppm Pt. The heat source was removed and the exothermic hydrosilation reaction was allowed to proceed until no further temperature increase was noted. Heat was then added to the mixture as needed to keep its temperature at 75° C. for 4 hours. Care was taken never to allow the reaction pot to exceed 100° C. A clear solution of a siloxane-alkyl copolymer with <0.1 ccH$_2$/gm of residual silanic hydrogen content and a 25° C. viscosity of 28 cSt was obtained.

Example 20

A well stirred mixture of 41.14 grams of Polyether F, 58.9 grams of an organohydrogen-polysiloxane having the average formula MD$_2$D'$_1$M and 300 grams (75 wt %) of linseed oil was deacrated by nitrogen sparge and heated to 80° C. A solution of H$_2$PtCl$_6$.6H$_2$O in ethanol was added to the mixture in sufficient amount to provide 20 ppm Pt. The heat source was removed and the exothermic hydrosilation reaction was allowed to proceed until no further temperature increase was noted. Heat was then added to the mixture as needed to keep its temperature at 80° C. for 2 hours. Care was taken never to allow the reaction pot to exceed 100° C. A clear solution of a siloxane-oxyalkylene copolymer containing no gel particles and no detectable levels of residual silanic hydrogen was obtained. Its viscosity at 25° C. was 37 cSt.

Example 21

A well stirred mixture of 41.2 grams of Polyether F, 48.75 grams of an organohydrogen-polysiloxane having the average formula MD$_2$D'$_{1.5}$M and 300 grams (75 wt %) of safflower oil was deaerated by nitrogen sparge and heated to 80° C. A solution of H$_2$PtCl$_6$.6H$_2$O in ethanol was added to the mixture in sufficient amount to provide 20 ppm Pt. The heat source was removed and the exothermic hydrosilation reaction was allowed to proceed until no further temperature increase was noted. Heat was then added to the mixture as needed to keep its temperature at 80° C. for 2 hours. Care was taken never to allow the reaction pot to exceed 100° C. A clear solution of a siloxane-oxyalkylene copolymer containing no gel particles and no detectable levels of residual silanic hydrogen was obtained. Its viscosity at 25° C. was 37 cSt.

The data show that all the hydrosilations proceeded to completion with observable exotherms. Certain of the copolymer products had structures, viscosities, and surface activities which made them suitable as surfactants for the production of polyurethane foams.

Examples 22 and 23

Two polyurethane foam surfactants were prepared by vigorously mixing 64 weight per cent of a siloxane-alkyl copolymer as described in U.S. Pat. No. 5,001,248 with a 36 weight per cent of a low molecular weight fractionated polydimethylsiloxane (available from Dow Coring Corporation as F-11630). This mixture was then divided into two equal portions. To one portion (Example 22) was added Polyether D in an amount sufficient to stabilize and obtain high quality high resiliency molded foam. To the second portion (Example 23) was added soybean oil in the same weight ratio as the Polyether D of Example 22. Both Example 22 and Example 23 afforded clear homogenous products.

VOLATILITY TEST

Volatility of the reaction products of Examples 1–21 was determined by the following method (ASTM D 4559-92): (A) Pre-weigh a 2 inch aluminum dish to the nearest 0.1 mg. (B) Add approximately 1 gram of sample weighed to the nearest 0.1 mg. (C) Repeat steps A and B for duplicate determination. (D) Heat for one hour at 110° C. at atmospheric pressure in a forced draft oven set at 110° C. (E) Cool the sample in air for 10 minutes and reweigh. The volatility is calculated utilizing the following equations:

Wt % Solids=100−[(B−A)×100/B]

Volatility=100−Wt % Solids where A=weight of sample after heating and B=Weight of sample before heating A high weight percent solids value corresponds to low volatility. The volatility is reported as the average of the two results to the nearest 0.1%.

FOAM TEST

The copolymer products of Examples 12, 13, 15, 16, 20, 21, 22 and 23 were evaluated in the following high resiliency molded foam formulation by the following procedure.

A mixture of 100 parts of ARCOL™ E-785 polyol base (available from Arco Chemical Company), 2.00 parts of surfactant from each of Examples 12, 13, 15, 16, 20, 21, 22, and 23, 0.3 parts of NIAX® Catalyst A-33 (available from Witco Corporation), 0.3 parts of NIAX® Catalyst C-174 (available from Witco Corporation), and 3.2 parts water, was thoroughly mixed. To the above mixture was added 80 parts polymeric MDI (methylenediphenylene diisocyanate) and 80 parts of TDI (toluene diisocyanate, both available from Bayer Corporation) and the resulting mixture was mixed on a high speed mixer for 5 seconds and then poured into a 15×15×4 inch heated aluminum mold at 130° F. The mixture was allowed to foam and rise to maximum height and was then cured at room temperature for 6 minutes.

Tests were run using this procedure, in duplicate, with surfactants from each of the aforementioned examples.

The cured foam was evaluated by visually observing and comparing foam cell uniformity. The results are shown in Table 1 and Table 2.

The data in Table 1 indicate that the higher boiling point natural vegetable oil solvents (Examples 7–21) provide for a facile hydrosilation reaction, while affording homogeneous copolymers with greatly improved product volatility, compared to the volatility of the copolymers of Examples 1–6 representative of prior practice. High resiliency molded foams stabilized with these various examples of the copolymers prepared in natural vegetable oil solvents (Examples 12, 13, 15, 16, 20, 21, 22 and 23) exhibit very fine uniform cell sizes and very good foam physical properties.

Table 2 (Examples 22 and 23) illustrates the enhanced wet compression set, humid aged compression set, and dry compression set which are beneficially obtained even when the high boiling natural vegetable oil is post added to the active surfactant formulation. Table 2 presents data with three typical state-of-the-art HR (high resiliency polyurethane foam) formulations. Two surfactants were used with each formulation, namely those prepared in Example 22 and Example 23 differing only in that the silicone containing surfactant of Example 22 contained polyalkylene glycol (Polyether D) and the silicone containing surfactant of Example 23 contained soybean oil. Five foam pads were made with each formulation with each surfactant and the three compression set properties were measured for each foam pad. Three measurements were made for each set property for each foam pad, such that the average values represent 15 measurements. The confidence interval for each average value was calculated. The results show that for all

TABLE 1

SUMMARY OF PROPERTIES OF THE COPOLYMERS OF EXAMPLES 1–21

| Foam Example | Solvent Type | Solvent wt % | Product Appearance | Residual SiH ccH2 | Viscosity cSt[1] | % Volatility | Foam Cell Uniformity[2] |
|---|---|---|---|---|---|---|---|
| 1 | Toluene | 23% | Clear | <0.1 | 215 | 23.3% | — |
| 2 | Toluene | 22% | Clear | 0.0 | 5 | 32.9% | — |
| 3 | Toluene | 23% | Clear | 0.0 | 4 | 49.6% | — |
| 4 | Toluene | 23% | Clear | 0.5 | 12 | 11.5% | — |
| 5 | Toluene | 23% | Clear | 0.2 | 4 | 38.8% | — |
| 6 | UA-11 | 50% | Clear | 0.0 | 6 | 39.2% | — |
| 7 | Soybean | 80% | Clear | 0.0 | 29 | 2.40% | — |
| 8 | Soybean | 50% | Clear | 0.0 | 64 | 0.51% | — |
| 9 | Soybean | 50% | Clear | 0.0 | 24 | 5.81% | — |
| 10 | Soybean | 50% | Clear | 0.0 | 275 | 0.08% | — |
| 11 | Soybean | 50% | Clear | 0.0 | 31 | 1.52% | — |
| 12 | Soybean | 75% | Clear | 0.0 | 33 | 6.54% | 2 |
| 13 | Soybean | 77% | Clear | 0.0 | 36 | 5.99% | 2 |
| 14 | Soybean | 50% | Clear | 0.0 | 83 | 1.51% | — |
| 15 | Soybean | 75% | Clear | 0.0 | 32 | 6.06% | 2 |
| 16 | Soybean | 75% | Clear | <0.1 | 36 | 5.60% | 2 |
| 17 | Linseed | 78% | Clear | 0.0 | 28 | 2.20% | — |
| 18 | Linseed | 50% | Clear | <0.1 | 29 | 2.62% | — |
| 19 | Linseed | 75% | Clear | <0.1 | 28 | 0.73% | — |
| 20 | Linseed | 75% | Clear | 0.0 | 37 | 7.86% | 2.5 |
| 21 | Safflower | 75% | Sl. Haze | <0.1 | 37 | 5.94% | 2 |

1. Cannon-Fenske at 25° C.
2. Foam Cell Uniformity is judged by the structure of the foam where a 1 has small uniform cell structure and a 10 has large non-uniform coarse cell structure. Foams were evaluated in duplicate and values averaged.

three formulations, all three sets were lowered by the use of soybean oil. The reduction is significant at the 95% probability level in all cases, except for the dry compression set results in Formulation 1 where the reduction is significant at the 90% probability level.

TABLE 2

| Component | Formulation, pphp | | | | | |
|---|---|---|---|---|---|---|
| | Formulation 1 | | Formulation 2 | | Formulation 3 | |
| Polyol A | 75 parts | 75 parts | 25 parts | 25 parts | 50 parts | 50 parts |
| Polyol B | 25 parts | 25 parts | 75 parts | 75 parts | 50 parts | 50 parts |
| Diethanolamine | 1.5 parts | 1.5 parts | 1.2 parts | 1.2 parts | 1.4 parts | 1.4 parts |
| Water | 4.2 parts | 4.2 parts | 3.8 parts | 3.8 parts | 4.2 parts | 4.2 parts |
| Amine Catalyst A | 0.15 parts | 0.15 parts | 0.15 parts | 0.15 parts | 0.1 parts | 0.1 parts |
| Amine Catalyst B | 0.4 parts | 0.4 parts | 0.35 parts | 0.35 parts | 0.45 parts | 0.45 parts |
| TDI 80/20, Index | 100 | 100 | 100 | 100 | 100 | 100 |
| Silicone Surfactant Example of Example 22, parts | 1.4 | 0 | 1.45 | 0 | 1.0 | 0 |
| Silicone Surfactant of Example 23, parts | 0 | 1.4 | 0 | 1.45 | 0 | 1.0 |

TABLE 2-continued

| Component | Formulation 1 | | Formulation 2 | | Formulation 3 | |
|---|---|---|---|---|---|---|
| Dry Compression Set (50%) average value | 8.80 | 7.89 | 12.26 | 10.11 | 9.85 | 8.65 |
| Dry Compression Set (50%) standard deviation | 1.03 | 0.72 | 1.52 | 0.91 | 1.00 | 1.28 |
| Dry Compression Set (50%) 95% confidence interval | ±0.49 (at 90%) | ±0.34 (at 90%) | ±0.86 | ±0.51 | ±0.57 | ±0.72 |
| Humid Aged Compression Set (75%) average value | 15.70 | 13.76 | 22.03 | 17.54 | 17.06 | 15.85 |
| Humid Aged Compression Set (75%) standard deviation | 1.23 | 1.27 | 2.30 | 1.42 | 1.40 | 1.43 |
| Humid Aged Compression Set (75%) 95% confidence interval | ±0.69 | ±0.72 | ±1.30 | ±0.81 | ±0.79 | ±0.81 |
| Wet Set (50%) average value | 21.30 | 18.55 | 33.65 | 32.26 | 28.01 | 23.74 |
| Wet Set (50%) standard deviation | 1.23 | 1.46 | 1.18 | 1.14 | 2.23 | 1.38 |
| Wet Set (50%) 95% confidence interval | ±0.70 | ±0.83 | ±0.67 | ±0.65 | ±1.26 | ±0.78 |

Polyol A is ARCOL™ E-656 (available from Arco Chemical Company) which is a clear polyol based on ethylene and propylene oxides which has a hydroxyl number of about 35 mg KOH Polyol B is ARCOL™ E-688 (available from Arco Chemical Company) which is a polymer polyol containing about 40% by weight acrylonitrile/styrene polymer in a polyol based on ethylene and propylene oxides which has a hydroxyl number of about 22 mg KOH Amine Catalyst A is NIAX® Catalyst A-1 (available from Witco Corporation)

Amine Catalyst B is NIAX® Catalyst A-33 (available from Witco Corporation).

Compression Sets as received were tested by ASTM D3574 test I, Humid Aging by ASTM D3574 Test J. Wet set measurements were made according to Toyota Engineering standard TSM7100G.

Table 3 presents foam flammability results with the silicone containing surfactants of Example 22 and Example 23. The foam formulation used was such that it intentionally exacerbated the combustion tendency of the foam. Eighteen identical foam samples were made with each surfactant and the flammability was tested according to DOT MVSS No. 302. The most desirable test outcome is SE (self-extinguishing), followed by SENBR (self-extinguishing, no burn rate). Both SE and SENBR arc acceptable outcomes, whereas SEB (self-extinguishing, burn rate) is not acceptable. The results in Table 3 show that Silicone Surfactant Example 23, which utilizes soybean oil improves the combustion properties of the foam.

TABLE 3

| Surfactant | Number SE | Number SE NBR | Number SEB |
|---|---|---|---|
| Silicone Surfactant Example 22 | 10 | 4 | 4 |
| Silicone Surfactant Example 23 | 13 | 2 | 3 |

What is claimed is:

1. A composition comprising the reaction product of (a) a polyisocyanate and (b) a polyol wherein the reaction takes place in the presence of (c) an oil component selected from the group consisting of naturally occurring drying and semi-drying vegetable oils, hydrogenated derivatives thereof, methylated derivatives thereof, and mixtures of any of the foregoing, said oil component being a liquid having a boiling point of at least 175° C., and (d) an organosiloxane copolymer surfactant which reaction product is a high resiliency polyurethane foam.

2. A composition according to claim 1 wherein the polyol (b) is a polyester or polyether polyol.

3. A composition according to claim 2 wherein the polyisocyanate (a) has from 2.0 to 3.5 isocyanate functionalities.

4. A composition according to claim 3 wherein the oil (c) is selected from the group consisting of: soybean oil, Lincoln bean oil, Manchurian bean oil, corn oil, safflower oil, palm oil, linseed oil, sesame oil, perilla oil, dehydrated castor oil and olive oil.

5. A composition according to claim 1 wherein the surfactant (d) is the reaction product of (e) one or more organohydrogensiloxane comprised of units of the formula $$R_aH_bSiO_{(4-a-b)/2}$$

wherein each R group represents a substituted or unsubstituted monovalent hydrocarbon radical of from 1 to 12 carbon atoms, a and b are integers, each a is 0 to 3, each b is 0 to 1, and (a+b) is 0 to 3; and (f) an unsaturated polyoxyalkylene or alkene component selected from the group consisting of compounds of the formulas $$R^1(OCH_2CH_2)_z(OCH_2CH(R^3))_w(OCH(R^3)CH_2)_y\text{—}OR^2,$$

and $$CH_2\text{=}CH\text{—}R^4$$

and mixtures thereof, wherein $R^1$ denotes a monovalent unsaturated hydrocarbon containing from 3 to 10 carbon atoms; $R^2$ is selected from the group consisting of hydrogen, alkyl groups containing one to eight carbon atoms, acyl groups containing 2 to 8 carbon atoms, tri-($C_1$–$C_8$-alkyl) silyl groups, and cycloaliphatic ether groups of 4 to 6 carbon atoms; $R^3$ and $R^4$ independently of each other contain 1 to 20 carbon atoms and each is a monovalent alkyl or branched alkyl group, aryl group, alkaryl group or cycloalkyl group, or $R^4$ may be hydrogen; and z has a value of 0 to 100, the subscripts w and y each are 0 to 120 and (w+y) has a value of 0 to 120, and (z+w+y)≧3.

6. A composition according to claim 5 wherein z is 1–50 and (w+y) is 1–50 and wherein said organohydrogensiloxane (e) have an average molecular weight of 134 to 16,000 daltons.

7. A composition according to claim 6 wherein R is methyl, $R^1$ is allyl, and $R^2$ is hydrogen, methyl, n-butyl, t-butyl, or acetyl.

8. A composition according to claim 7 wherein the composition is high resiliancy polyurethane foam.

9. A composition according to claim 1 wherein the reaction also took place in the presence of a catalyst.

10. A composition according to claim 1 wherein the oil has a boiling point greater than about 200 C.

11. A process comprising reacting a polyol (a) and a polyisocyanate (b) in the presence of an oil component (c) selected from the group consisting of naturally occurring drying and semi-drying vegetable oils, hydrogenated derivatives thereof, methylated derivatives thereof, and mixtures of any of the foregoing, said oil component being a liquid having a boiling point of at least 175° C. and an organosiloxane copolymer surfactant (d) wherein the reaction product is a high resiliency polyurethane foam.

12. A process according to claim 11 wherein the reaction takes place in the presence of a catalyst.

13. A process according to claim 12 wherein said oil component (c) comprises 5 to 95 wt. % of the mixture of the surfactant (d) and the oil (c).

14. A process according to claim 13 wherein the oil component (c) is selected from the group consisting of: soybean oil, Lincoln bean oil, Manchurian bean oil, corn oil, safflower oil, palm oil, linseed oil, sesame oil, perilla oil, cottonseed, coconut, dehydrated castor oil and olive oil.

15. A process according to claim 14 wherein the oil component (c) is soybean oil.

16. A process according to claim 11 wherein polyurethane or polyisocyanurate are made.

17. A process according to claim 16 wherein high resiliancy polyurethane foam is made.

18. A process according to claim 13 wherein there is additionally a blowing agent present.

19. A process according to claim 11 wherein the oil is a semi-drying oil.

20. A composition according to claim 1 wherein the oil is a semi-drying oil.

21. A composition according to claim 1 wherein the oil is a drying oil.

* * * * *